(12) United States Patent
Bremont et al.

(10) Patent No.: US 7,563,506 B2
(45) Date of Patent: Jul. 21, 2009

(54) FIXING DEVICE

(75) Inventors: Michel Bremont, Gex (FR); Yves Papirer, Rixheim (FR); Mathias Haensel, Rummingen (DE); Ysuki Takenaka, Fujisawa (JP)

(73) Assignee: A. Raymond et Cie, Grenoble (FR)

( * ) Notice: Subject to any disclaimer, the term of this patent is extended or adjusted under 35 U.S.C. 154(b) by 254 days.

(21) Appl. No.: 11/568,543

(22) PCT Filed: May 19, 2005

(86) PCT No.: PCT/EP2005/005426

§ 371 (c)(1),
(2), (4) Date: Nov. 1, 2006

(87) PCT Pub. No.: WO2006/002715

PCT Pub. Date: Jan. 12, 2006

(65) Prior Publication Data

US 2007/0224387 A1 Sep. 27, 2007

(30) Foreign Application Priority Data

Jun. 29, 2004 (DE) .................. 10 2004 031 551
Jul. 7, 2004 (DE) ............... 20 2004 010 375 U

(51) Int. Cl.
*B32B 7/04* (2006.01)
(52) U.S. Cl. .................. 428/347; 24/114.6; 411/82.3; 411/908
(58) Field of Classification Search .............. 428/64.1, 428/346, 347; 411/82, 82.3, 82.5, 373, 908; 24/114.6; 248/205.3
See application file for complete search history.

(56) References Cited

U.S. PATENT DOCUMENTS

| 2,557,434 | A | | 6/1951 | Hoverder |
| 4,250,596 | A | * | 2/1981 | Hara et al. ............ 24/289 |
| 4,306,344 | A | | 12/1981 | Floss |
| 4,421,288 | A | | 12/1983 | Blaszkowski |
| 4,566,924 | A | * | 1/1986 | Hara et al. ............ 156/73.5 |
| 4,593,878 | A | * | 6/1986 | Stewart ............... 248/549 |
| 4,636,124 | A | | 1/1987 | Gugle et al. |
| 4,853,075 | A | | 8/1989 | Leslie |
| 6,083,558 | A | | 7/2000 | Bremont |

FOREIGN PATENT DOCUMENTS

| DE | 3610734 | | 11/1986 |
| DE | 4023713 | | 1/1992 |
| DE | 9320579 | U1 | 11/1994 |
| DE | 29722126 | U1 | 2/1998 |
| DE | 19645000 | | 5/1998 |
| EP | 0140568 | | 5/1985 |

* cited by examiner

*Primary Examiner*—Alexander Thomas
(74) *Attorney, Agent, or Firm*—Baker & Daniels LLP

(57) ABSTRACT

A fastening arrangement comprises a fastening element provided with a fastening portion having a planar outer side surface, and a hot-melt adhesive that can be melted in order to fasten the fastening element to a substrate. The fastening element is provided with a receiving recess that is open in the direction of the planar outer side surface. A retaining structure is provided in the region of the receiving recess. The hot melt adhesive is configured as a compact whose shape is adapted to the retaining structure such that the compact can be connected to the fastening element. The fastening arrangement can thus be prefabricated without incipient melting of the hot-melt adhesive.

10 Claims, 6 Drawing Sheets

FIXING DEVICE

CROSS-REFERENCE TO RELATED APPLICATION

This application is a U.S. National Phase Patent Application based on International Application Ser. No. PCT/EP2005/005426 filed May 19, 2005, the disclosure of which is hereby explicitly incorporated by reference herein.

BACKGROUND OF THE INVENTION

The present invention concerns a fastening arrangement.

One fastening arrangement is known from DE 196 45 000 A1. The prior fastening arrangement comprises a fastening element provided with a fastening portion having a planar outer-side surface. The fastening arrangement is also equipped with a hot-melt adhesive, which after being partially melted at relatively low temperature adheres as an adhesive layer to the planar outer-side surface, and at a relatively high temperature can be melted onto a substrate to fasten the fastening arrangement so prefabricated.

Although add-on parts can be reliably connected to a substrate with the prior art fastening arrangement, unless the melting conditions for the hot-melt adhesive are strictly adhered to there is some risk either that, if the incipient melting temperature is too low, the hot-melt adhesive will not adhere adequately to the planar outer-side surface and may spall for example during shipment of the fastening arrangements as bulk goods; or that if the incipient melting temperature is too high, the hot-melt adhesive will be activated then and there, and the fixity obtained will be insufficient to produce an adhesive bond between the fastening arrangement and a substrate when the two are joined.

SUMMARY OF THE INVENTION

The object underlying the invention is to specify a fastening arrangement of the aforesaid species that can be prepared for use in a very simple and reliable manner.

This object is achieved by means of a fastening arrangement comprising a fastening element provided with a fastening portion having a planar outer-side surface, and comprising a hot-melt adhesive that can be melted in order to fasten the fastening element to a substrate and can be connected to the planar outer-side surface of the fastening element and to the substrate, the fastening element comprising a receiving recess that is open in the direction of the planar outer-side surface and the hot-melt adhesive being configured as a compact that can be inserted in the receiving recess, characterized in that a retaining structure is configured in the region of the receiving recess, and in that the shape of the compact is adapted to the retaining structure such that the compact can be connected to the fastening element.

The fact that in the inventive fastening arrangement the hot-melt adhesive is configured as a compact, and for purposes of prefabrication the fastening arrangement can be connected to the fastening element via the retaining structure, without exposure to heat, allows the fastening arrangement to be prefabricated in a very simple and reliable manner.

Further suitable configurations of the invention are the subject matter of the dependent claims.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
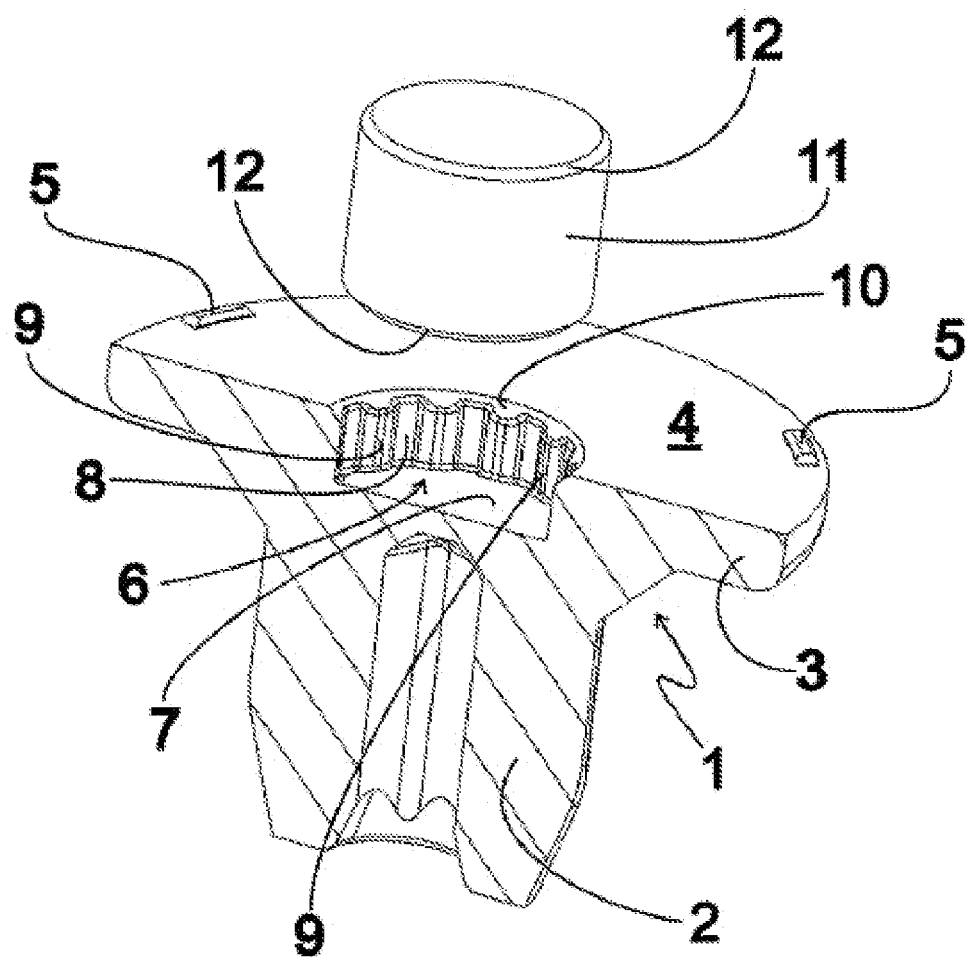
FIG. 1 is a perspective sectional view of a first exemplary embodiment of an inventive fastening arrangement comprising a fastening element and a compact, shown prior to its insertion in a receiving recess, which embodiment includes a number of edge ribs as a retaining structure.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DESCRIPTION OF THE PRESENT INVENTION

FIG. 1 is a perspective sectional view of a first exemplary embodiment of an inventive fastening arrangement comprising a fastening element 1 provided with an elongated shaft portion 2 and, as the fastening portion, a flattened collar plate 3 of roundish circumference, joined to the shaft portion 2. Shaft portion 2 is configured as elongated and serves to fasten an add-on piece, not shown in FIG. 1, whereas the collar plate 3 has an outer-side surface 4, planar in this exemplary embodiment, that faces away from shaft portion 2 and from whose edge region rise a number of spacers 5 projecting above the surface 4.

Disposed in roughly the center of collar plate 3 is a receiving recess 6, which is open in the direction of planar outer-side surface 4. Receiving recess 6 has a flat inner bottom wall 7 and a roundishly circumferential inner side wall 8 on which a number of radially inwardly projecting edge ribs 9 are configured as a retaining structure. The edge of retaining recess 6 adjacent planar outer-side surface 4 is configured as an inwardly beveled conical surface 10.

The first exemplary embodiment according to FIG. 1 is also provided with a hot-melt adhesive formed as a substantially cylindrical compact 11 configured on its bases with outwardly beveled conical surfaces 12.

Figure 2:
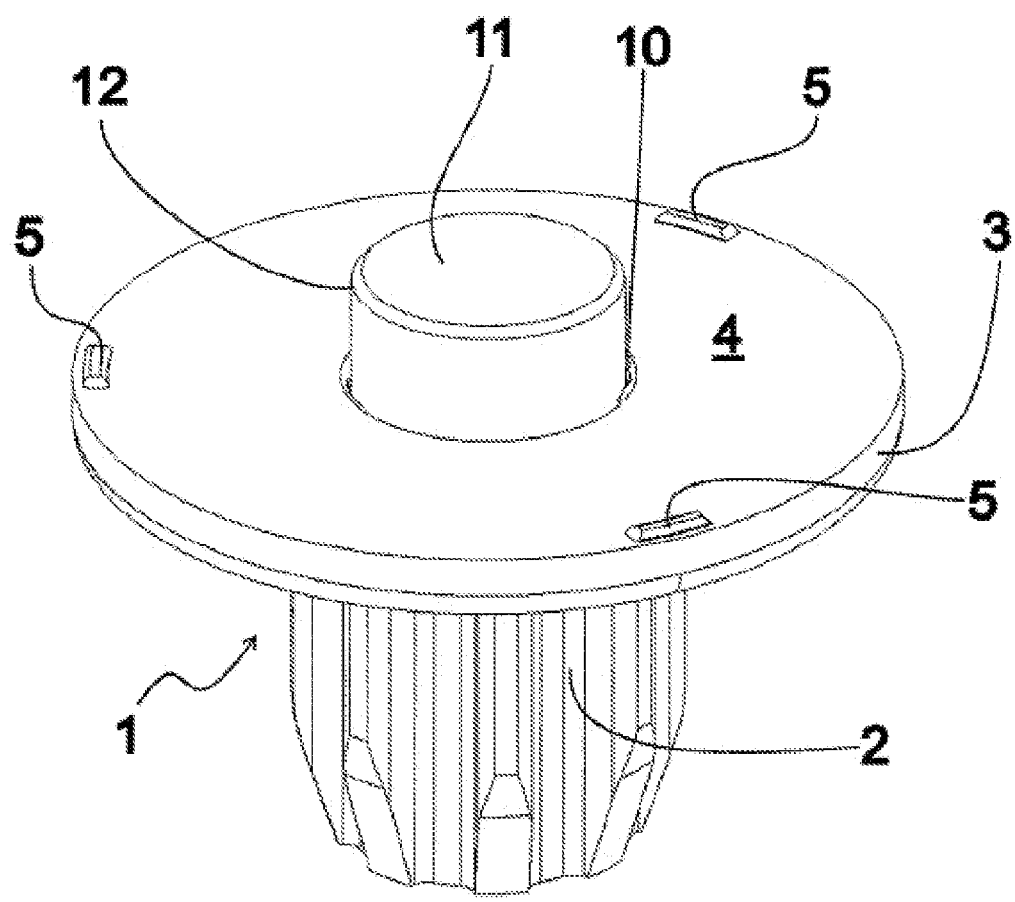
FIG. 2 is a perspective view of the first exemplary embodiment in a prefabricated arrangement with the compact inserted in the receiving recess.

FIG. 2 is a perspective view of the first exemplary embodiment in a prefabricated arrangement, with compact 11 inserted in receiving recess 6. On the insertion of compact 11 into receiving recess 6, an operation that is facilitated by the centering interaction of conical surfaces 10, 12, the edge ribs 9 engage in compact 11, causing compact 11 to be mechanically connected to fastening element 1. In this state, compact 11 projects above planar outer-side surface 4, the projecting volume being adapted so as to be slightly smaller than the volume extending between the surrounding edge of collar plate 3 and the tops of the spacers 5. In this prefabricated arrangement, the fastening arrangement can be shipped in bulk without any problems.

Figure 3:
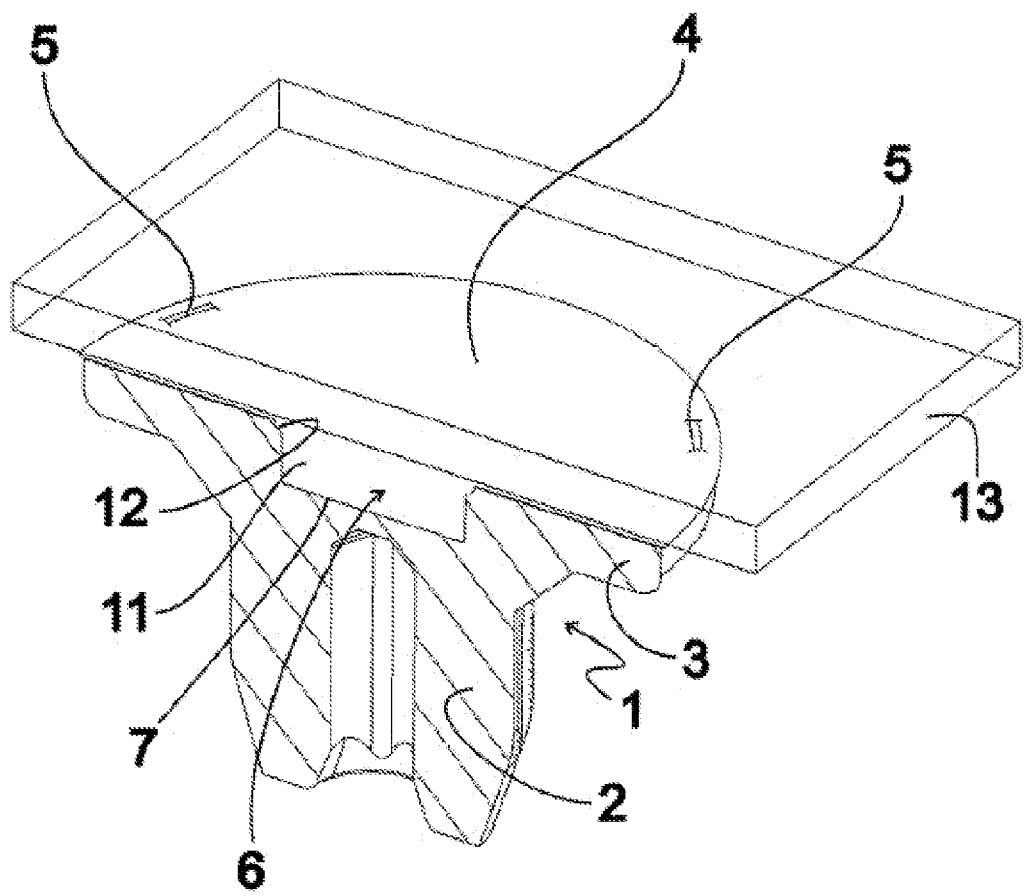
FIG. 3 is a perspective sectional view of the first exemplary embodiment after the compact has been melted and thus firmly bonded to a substrate.

FIG. 3 is a perspective sectional view of the first exemplary embodiment after compact 11 has been melted at a relatively high temperature sufficient to plastify and activate the hot-melt adhesive, which is now firmly bonded to a substrate 13 implemented for example as a glass plate. It is evident from FIG. 3 that after the hot-melt adhesive has been melted and activated, and then has subsequently hardened after the fastening element 1 is placed on the substrate 13, the volume of compact 11 which in the prefabricated arrangement projects above the planar outer-side surface 4 has spread from the rim of receiving recess 6 to the outer edge of collar plate 3, with the most elevated sides of the spacers 5, i.e. those facing away from the planar outer-side surface, resting against the substrate 13. The fastening arrangement is now firmly bonded to the substrate 13 via an areal adhesive bond.

Figure 4:
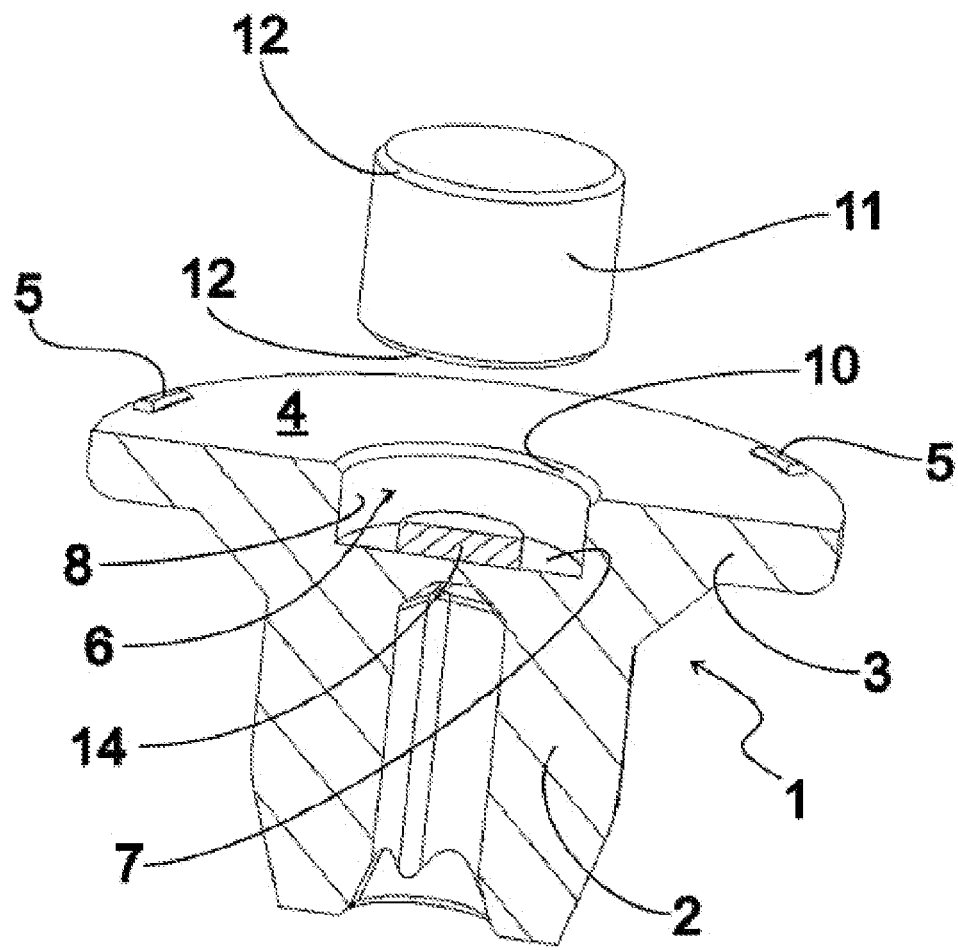
FIG. 4 is a perspective sectional view of a second exemplary embodiment of an inventive fastening arrangement comprising a fastening element and a compact, shown prior to its insertion in a receiving recess, which embodiment includes an adhesive dot as a retaining structure.

FIG. 4 is a perspective sectional view of a second exemplary embodiment of an inventive fastening arrangement; like elements of the first exemplary embodiment FIGS. 1 to 3 and the second exemplary embodiment according to FIG. 4 have been given the same reference numerals and will not be described in further detail below. In the second exemplary embodiment, as illustrated in FIG. 4, the lateral inside edge 8 is configured as smooth-walled, the inner diameter of receiving recess 8 being slightly larger than the outer diameter of compact 11. The retaining structure provided in the second exemplary embodiment is an adhesive dot 14 of a room-temperature-curing adhesive, applied to the bottom inside wall 7. To join compact 11 to fastening element 1, compact 11 is inserted in receiving recess 6 while adhesive dot 14 is still tacky, and is left there until the adhesive bond between fastening element 1 and compact 11 is strong enough so that compact 11 will remain in receiving recess 6 during the handling operations that follow the prefabrication completed in this manner.

Figure 5:
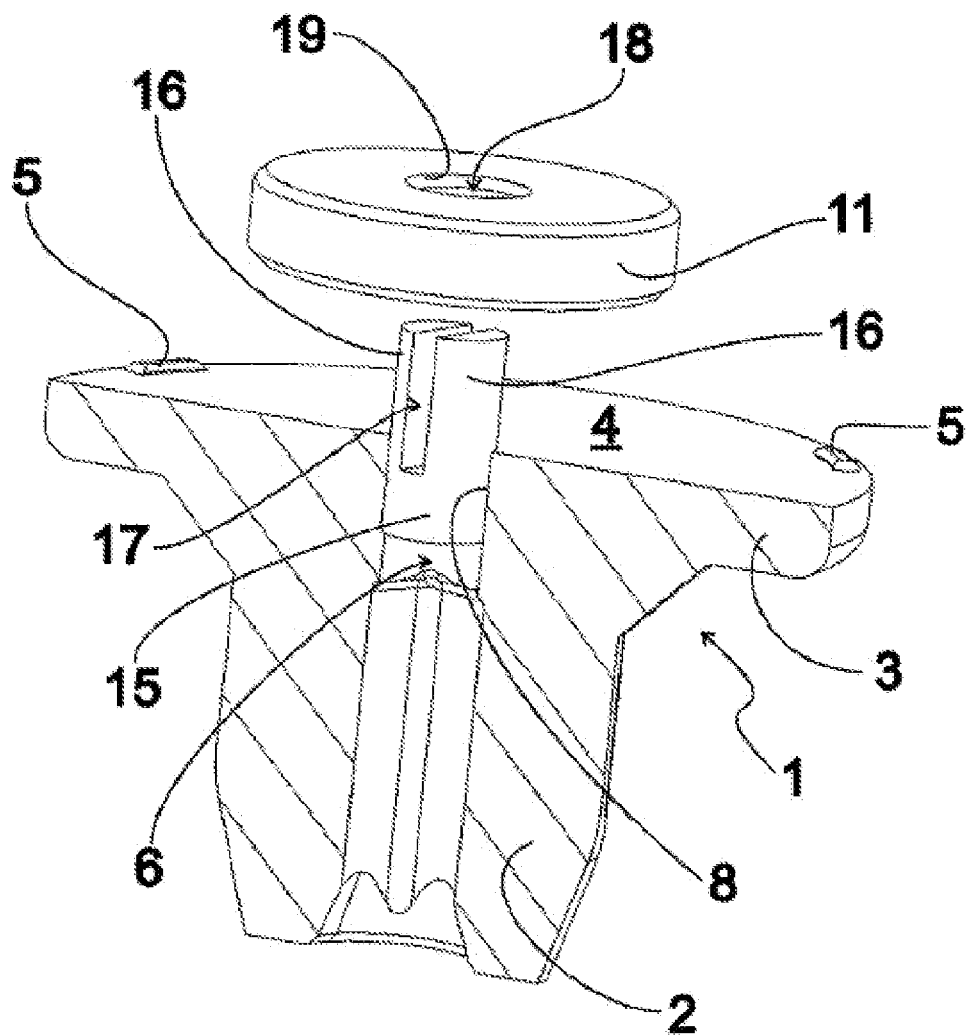
FIG. 5 is a perspective sectional view of a third exemplary embodiment in which a retaining pin of a retaining structure is inserted in a receiving recess of a fastening element and can be guided into a pin recess formed in a compact.

FIG. 5 is a perspective sectional view of a third exemplary embodiment of an inventive fastening arrangement; like elements of the first exemplary embodiment according to FIGS. 1 to 3, the second exemplary embodiment according to FIG. 4 and the third exemplary embodiment according to FIG. 5 have been given the same reference numerals and will not be described in further detail below. The third exemplary embodiment according to FIG. 5 has as a retaining structure a retaining pin 15, which in the representation of FIG. 5 is inserted in the receiving recess 6 by one end comprising a solid portion and is there secured against drop-out by a force lock with inner side wall 8. At the end opposite the solid portion, retaining pin 15 is configured with two spring legs 16 between which an interspace 17 is left for deflection.

In the third exemplary embodiment of FIG. 5, compact 11 is configured with a pin recess 18 extending between the opposite end faces, the edges confronting the end faces each being configured with an inwardly inclined conical surface 19 to facilitate the introduction of the spring legs 16. In the prefabricated arrangement, in the exemplary embodiment of FIG. 5 the compact 11 is slipped over retaining pin 15 and maintained in contact with planar outer-side surface 4.

To connect the fastening arrangement according to the exemplary embodiment of FIG. 5 to a substrate not shown in FIG. 5, the substrate and the fastening arrangement are brought into connection with compact 11 in the molten state, retaining pin 15 sinking axially into receiving recess 6 to an extent such that the end faces of the spring legs 16 that project above planar outer-side surface 4 lie in the plane of the most elevated regions of the spacers 5.

Figure 6:
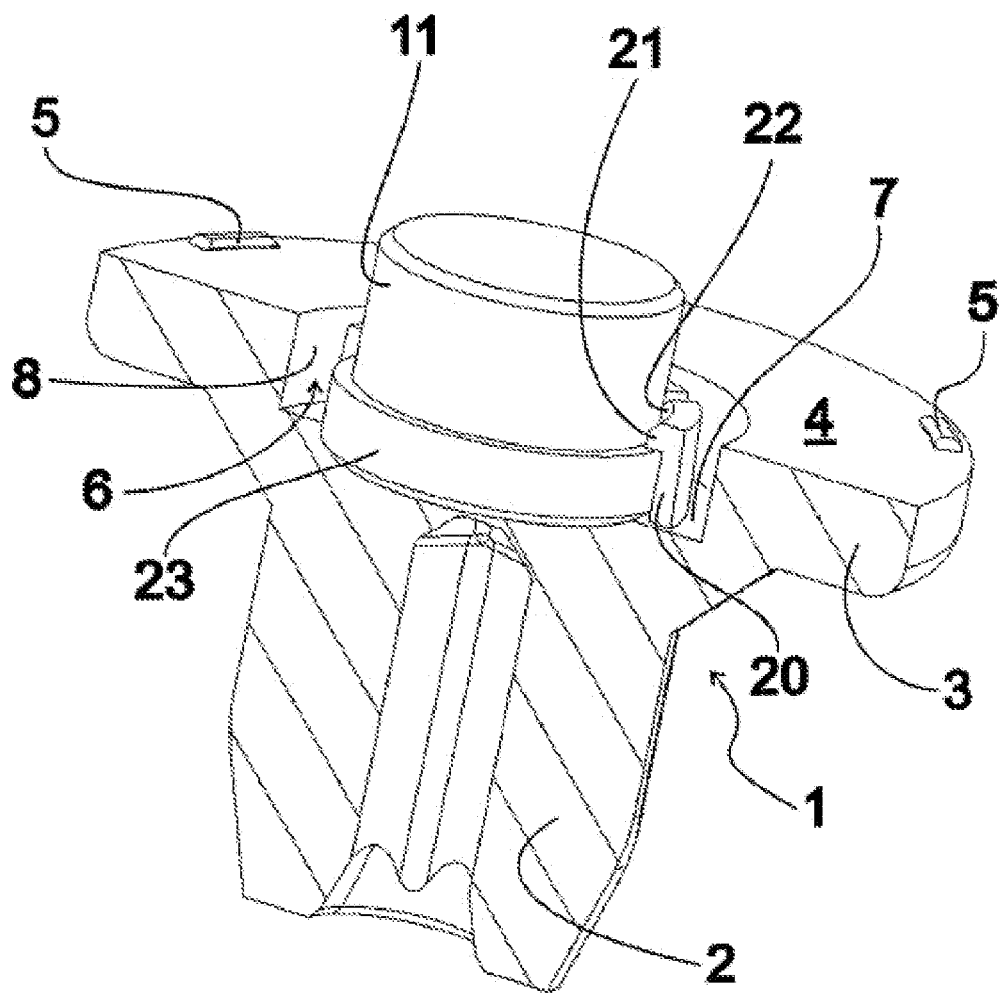
FIG. 6 is a perspective sectional view of a fourth exemplary embodiment of an inventive fastening arrangement comprising a fastening element in whose receiving recess a compact is inserted and maintained in this arrangement by a retaining structure comprising retaining tongues that are engaged with an annular collar.

FIG. 6 is a perspective sectional view of a fourth exemplary embodiment of an inventive fastening arrangement; like elements of the first exemplary embodiment according to FIGS. 1 to 3, the second exemplary embodiment according to FIG. 4, the third exemplary embodiment according to FIG. 5, and the fourth exemplary embodiment according to FIG. 6 have been given the same reference numerals and will not be described in further detail below. In the fourth exemplary embodiment according to FIG. 6, the retaining structure is provided with a number of axially extending retaining tongues 20, disposed annularly at a radial distance from inner side wall 8 and formed by one end onto inner bottom wall 7. At the end pointing away from inner bottom wall 7, the retaining tongues 20 each comprise a detent nose 21 that is oriented radially inward and is configured on its inner face with an inwardly sloping conical surface 22.

In the fourth exemplary embodiment according to FIG. 6, the compact 11 is configured in an axial end region with a circumferentially continuous annular collar 23, adapted in its radial dimension to the detent noses 21. To prefabricate the fastening arrangement, in the fourth exemplary embodiment according to FIG. 6 the compact 11 can be inserted with annular collar 23 into receiving recess 6 until the detent noses 21 engage behind annular collar 23, which forms a counterpart structure that is complementary to detent noses 21, and thereby connect compact 11 to fastening element 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A fastening arrangement for use in fastening to a substrate via a hot-melt adhesive, said fastening arrangement comprising:
    a fastening element including a fastening portion having a substantially planar outer side surface, a receiving recess that is open in a direction of said outer side surface, and retaining structure associated with said receiving recess, said retaining structure including a plurality of ribs projecting inwardly from an inner side wall of said recess; and
    a compact of hot-melt adhesive received within said recess, said compact retained within said recess by engagement with said ribs.

2. The fastening arrangement of claim 1, wherein said recess includes a bottom wall.

3. The fastening arrangement of claim 1, wherein said compact is dimensioned smaller than said recess.

4. The fastening arrangement of claim 1, wherein said compact is cylindrical in shape, and includes a planar base and an outwardly beveled conical surface adjacent said planar base.

5. The fastening arrangement of claim 1, wherein said recess includes an edge adjacent said outer side surface, said edge including an inwardly beveled conical surface.

6. A fastening arrangement for use in fastening to a substrate via a hot-melt adhesive, said fastening arrangement comprising:
- a fastening element including a fastening portion having a substantially planar outer side surface, a receiving recess that is open in a direction of said outer side surface, and retaining structure associated with said receiving recess; and
- a compact of hot-melt adhesive received within said recess and retained within said recess by said retaining structure, wherein said compact is cylindrical in shape and includes a first, outer diameter, and said recess is also cylindrical in shape and includes a second, inner diameter, said second diameter greater than said first diameter.

7. The fastening arrangement of claim 6, wherein said recess includes a bottom wall and an inner side wall.

8. The fastening arrangement of claim 6, wherein said compact is cylindrical in shape, and includes a planar base and an outwardly beveled conical surface adjacent said planar base.

9. The fastening arrangement of claim 6, wherein said recess includes an edge adjacent said outer side surface, said edge including an inwardly beveled conical surface.

10. The fastening arrangement of claim 6, wherein said retaining structure includes a plurality of ribs projecting inwardly from an inner side wall of said recess, said compact retained within said recess by engagement with said ribs.

* * * * *